(12) United States Patent
Nath

(10) Patent No.: US 6,418,257 B1
(45) Date of Patent: *Jul. 9, 2002

(54) UVC LIQUID LIGHT GUIDE

(76) Inventor: Gunther Nath, Otto Heilmann Str. 3, Munich (DE), 82031

( * ) Notice: Subject to any disclaimer, the term of this patent is extended or adjusted under 35 U.S.C. 154(b) by 0 days.

This patent is subject to a terminal disclaimer.

(21) Appl. No.: 09/581,690
(22) PCT Filed: Dec. 1, 1998
(86) PCT No.: PCT/DE98/03572
§ 371 (c)(1), (2), (4) Date: Jun. 15, 2000
(87) PCT Pub. No.: WO99/32912
PCT Pub. Date: Jul. 1, 1999

(30) Foreign Application Priority Data

Dec. 15, 1997 (DE) ...................................... 297 22 130 U
Jul. 17, 1998 (DE) .......................................... 198 32 277

(51) Int. Cl.$^7$ .............................. G02B 6/20; G02B 6/00
(52) U.S. Cl. ......................... 385/125; 385/144; 385/142
(58) Field of Search ................................. 385/125, 141, 385/142, 144, 145; 362/562

(56) References Cited

U.S. PATENT DOCUMENTS

| | | | | |
|---|---|---|---|---|
| 5,412,750 A | * | 5/1995 | Nath | 385/125 |
| 5,675,689 A | * | 10/1997 | Nath | 385/125 |
| 5,857,052 A | * | 1/1999 | Nath | 385/125 |
| 6,163,641 A | * | 12/2000 | Eastgate | 385/125 |
| 6,314,226 B1 | * | 11/2001 | Nath | 385/125 |

FOREIGN PATENT DOCUMENTS

| | | | |
|---|---|---|---|
| DE | 4014363 | 11/1991 | G21K/5/04 |
| DE | 4233087 | 4/1994 | G02B/6/20 |

* cited by examiner

Primary Examiner—Hemang Sanghavi
Assistant Examiner—Omar Rojas, Jr.
(74) Attorney, Agent, or Firm—Galvin & Palmer

(57) ABSTRACT

Disclosed is a liquid light guide for transmitting UVC radiation formed of concentrically arranged Teflon® light guide tube having an internal totally reflecting coat of a fluorplpolymer layer within a sheath having water or another aqueous solution disposed between the sheath and the light guide tube. The light guide tube contain an aqueous solution of $NaH_2PO_4$. Also disclosed is a method of making the device.

10 Claims, 3 Drawing Sheets

UVC LIQUID LIGHT GUIDE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The invention relates to liquid light guides for transmitting UVC radiation.

2. Description of the Related Art

UVC light guides have been known for a long time. However, they consist of flexible glass fiber bundles. The individual fibers in these bundles are made of synthetic silica glass (refractive index $n_1$) and are sheathed with silica glass doped with fluorine (refractive index $n_2$), thus achieving a maximum optical angle of aperture $2\alpha$ of approx. 25° (sin $\alpha = \sqrt{n_1^2 - n_2^2}$). Such light guides made of silica glass fiber bundles are, among others, made by the Schott company. They are very expensive and can cover only a comparatively small solid angle of an incoherent UVC radiation source because of the small angle of aperture.

For more than 20 years a liquid light guide has been available for transmitting UVA radiation, said light guide comprising a Teflon® FEP tube filled with an aqueous $CaCl_2$ solution (n=1.435), as disclosed in DE PS 24 06 424. It has high transmission and excellent photochemical stability in the UVA range (320–400 nm), but is not suitable for transmitting UVC radiation because of photochemical degradation, for example at $\lambda$=250 nm. By shifting the pH value of the aqueous $CaCl_2$ solution from acidic to alkaline the photochemical stability and thereby the transmission stability can be expanded to comprise the UVB range (280–320 nm), cf. DE OS 195 18 147 or U.S. Pat. No. 5,737,473. But even the stabilized solution degrades at intensive radiation in the UVC range.

The patent application DE OS 40 14 363.5 discloses liquid light guides with other liquids for the stable transmission of radiation in the UVB range, said liquids belonging to the group of aqueous phosphate solutions, for example aqueous solutions made of $K_3PO_4$, $K_2HPO_4$, $KH_2PO_4$, $NaH_2PO4$, and $Na_2HPO_4$.

One disadvantage of such solutions is the low allowable optical refractive index compared to $CaCl_2/H_2O$ solutions due to salt precipitation in cold environments, resulting in an unsatisfactory maximum optical angle of aperture. A further disadvantage of aqueous phosphate solutions is their partial water vapor pressure, which is significantly higher than the one of aqueous $CaCl_2$ solutions, so that a liquid light guide with a phosphate solution in Teflon® FEP tube develops bubbles already after approx. one year despite the extremely low water vapor permeability of the fluorocarbon polymer, which is detrimental to radiation transmission. The recent marketing of new, highly transparent and extremely low refracting fluoropolymers (Teflon® AF, Hyflon® AD) by DuPont and Ausimont made it possible to use totally reflecting internal surfaces for light guides having a refractive index which is considerably lower than the one for Teflon® FEP. Thus a liquid light guide with phosphate solution has an acceptable maximum angle of aperture $2\alpha$ in the range of above 50°.

The new, "amorphous" fluoropolymers from DuPont and Ausimont permit a liquid phase internal coating of the Teflon® tube thus acting as polish for the internal surface of the extruded Teflon® tube so that the reflectivity of in particular short wavelength UV radiation is improved.

DE OS 40 24 445 and 42 33 087 as well as GP P 2 248 312 disclose liquid light guides using Teflon® AF as internal sheath surface. DE OS 40 24 445 mentions that fluoride solutions, for example KF in $H_2O$, are suitable for short wavelength UV radiation. However, a fluoride solution is disadvantageous in that the obtainable and practical refractive index of such a solution is rot much higher than n=1.35 to 1.36 and that such a solution partially dissolves the plugs of silica glass used to close both ends of the liquid light guide. The silica glass plugs are used as optical windows, and the attack on the polished glass surface has a detrimental effect on the optical transmission.

In view of the shortcoming of the prior art as hereinabove specified, it is desirable to be able to transmit UVC radiation with a liquid light guide comprising a liquid core and a sheath of plastic and having a larger optical angle of aperture, thus achieving a greater transmission capacity. Such light guides may even be less expensive to manufacture than those of the prior art.

BRIEF SUMMARY OF THE INVENTION

The invention provides novel liquid light guides for transmitting UVC radiation in the spectral range of 220–280 nm. The UVC light guide can be coupled to a non coherent source for UVC radiation, e.g. a medium pressure mercury lamp. The UVC radiation emitted by the light guide can be used, for example, for photochemical curing of adhesives and laquers. Preferably, the light guide is flexible.

DETAILED DESCRIPTION OF THE INVENTION

The objective of the invention is to find one liquid among the numerous light guiding liquids for the UVA and UVB range disclosed in the relevant prior art which can also be used as a light guiding liquid in the UVC range. Such a liquid has to have the following characteristics:

1. The liquid should be transparent in the UVC range (280 nm $\geq \lambda \geq$ 220 nm) for optical path lengths of up to 2000 mm. In other words the transparency in the UVC range should be close to the one of purest water.
2. The liquid for a UVC light guide should have a refractive index which is at least so great that an optical angle of aperture $2\alpha$ of approx. 50° is obtainable. The value should be reached with a refractive index of the totally reflecting sheath surface of n=1.29 to 1.325 so that bending losses of a light guide with typically a light active core of 5 mm remain acceptable.

3. The liquid should not decompose over a long period of time and constant irradiation from a UVC light source (for example a medium pressure mercury lamp), i.e. the liquid must remain stable in the photochemically extremely active UVC range. This demand is closely related to demand no. 1. Organic liquids (with the exception of a few perfluorated liquids with too low refraction) have no photochemical stability in the UVC range and are thus not suitable as light guiding liquids in this spectral range.

4. The liquid light guide filled with the UVC liquid should be immune to salt precipitation down to temperatures of at last $-10°$ C.

5. For marketing and safety reasons it would be desirable if the liquid were physiologically acceptable.

Only one liquid of the numerous light guiding liquids for the UVA and UVB range mentioned in the relevant prior art has proven suitable for the UVC range, i.e. an aqueous solution of $NaH_2PO_4$. This is illustrated by measuring the UV transmission in various aqueous saline solutions with an optical path length of 10 cm, where the refractive index of each saline solution had been adjusted to n=1.335, i.e. a value only 2/1000 above the one for $H_2O$. Only substances of the highest purity grade were used for these measurements, including the solvent $H_2O$. The salts in question are all mentioned in the prior art concerning UVB liquid light guides. In this way it is possible to determine the absolute position of each TV absorption edge with great precision, and any impurities in the ppm range which may still be present have no impact on the position of the UV edge.

Figure 1:
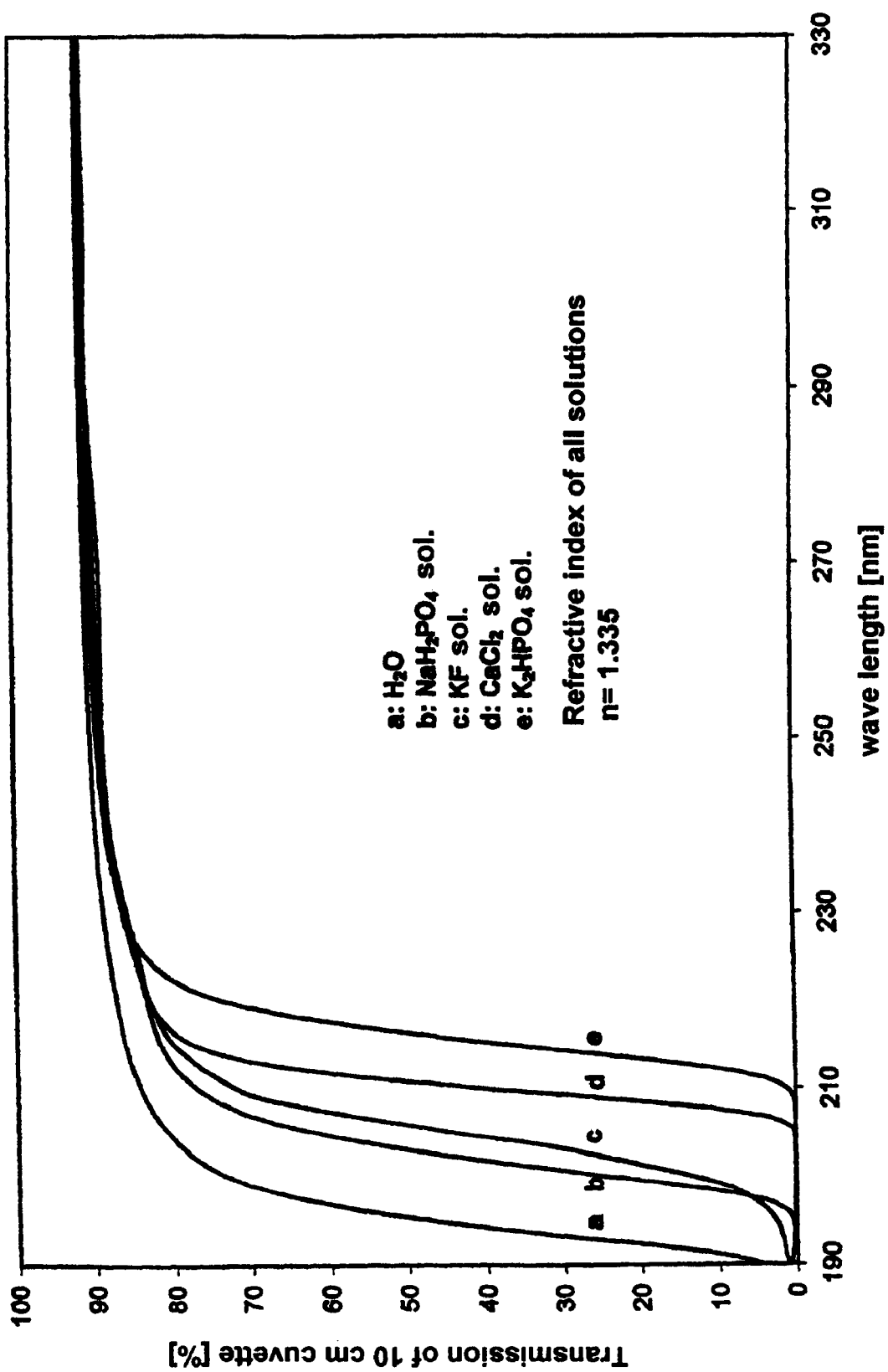
FIG. 1 is a graph showing the relative position of the UV absorption edge of the saline solutions with respect to each other.

FIG. 1 shows the relative position of die UV absorption edge of the measured saline solutions with respect to each other and in relation to the UV absorption edge of purest water. FIG. 1 illustrates also that the saline solutions known for the UVA and UVB range can also be suitable for the UVC range, as their transparency is comparatively good in the range of 220–280 nm. It has been shown that all liquids with one exception, i.e. $NaH_2PO_4/H_2O$, have serious disadvantages.

The aqueous solutions of $K_2HPO_4$ (due to its high alkalinity) and KF (due to the presence of HF) react with the surface of the silica glass window. This results in clouding of the optical window after approx. one year, strongly reducing the light guide's transmission. Moreover, a highly concentrated KF solution has so low a refractive index ($\leq 1.36$) that the angle of aperture is insufficient. Furthermore, such a solution is physiologically harmful.

An aqueous $CaCl_2$ solution is, as mentioned above, photochemically not stable in the UVC range. During an experiment with permanent irradiation of a liquid light guide made from $CaCl_2/H_2O$ and an unfiltered 25 Watt high pressure mercury lamp the transmission of the light guide fell from the starting value of 57% to 1% within 45 hours at $\lambda=250$ nm ($T_{250}$), cf. Table 1a.

The above-mentioned saline solutions on phosphate basis, i.e. $K_3PO_4$, $KH_2PO_4$, and $Na_2PO_4$, do not fulfill the criteria either. The solubility of $KH_2PO_4$, and $Na_2HPO_4$ in $H_2O$ is so low that no usable refractive index is obtainable. Moreover, in aqueous solution of $K_3PO_4$ is even more alkaline than a $K_2HPO_4$ solution so that optical silica glass windows are again attacked. Hence, there is only one of the described saline solutions left, i.e. an aqueous $NaH_2PO_4$ solution. Surprisingly it has been found that the $NaH_2PO_4$ solution fulfills all criteria 1–5 in a satisfactory manner. Furthermore, the transparency is optimum compared to solutions c-e in FIG. 1.

Using the $NaH_2PO_4$ solution an angle of aperture of at least 50° is obtainable, as the refractive index can be adjusted to the range of n=1.38–1.39. Such a solution is stable below a temperature of $-10°$, i.e. there is no salt precipitation. Moreover, the $NaH_2PO_4$ solution is photochemically stable in the UVC range. An experiment with permanent irradiation of a liquid light guide with $NaH_2PO_4/H_2O$ solution (n=1.38) and a 25 Watt UVC light source for up to 336 hours showed a constant transmission of approx. 65% at an experimental wavelength of $\lambda=250$ nm, cf. Table 1b. Furthermore the solution is physiologically harmless and does not attack the silica glass window, as it is acidic (pH=4–5).

Figure 2:
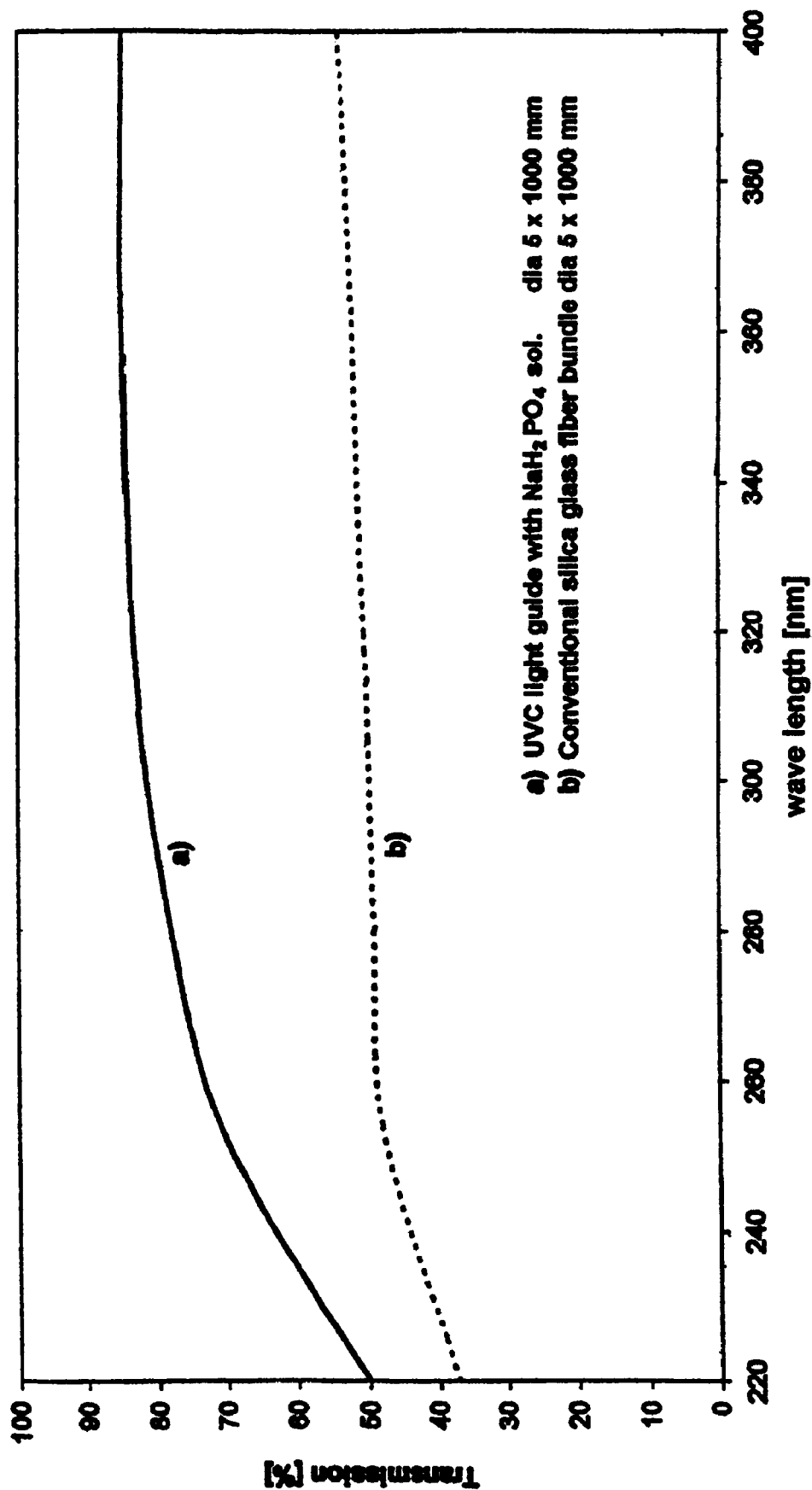
FIG. 2 is a graph showing the optical transmission of a UVC liquid light guide according to the invention.

FIG. 2 shows the optical transmission graph of a UVC liquid light guide with a length of 1000 mm and a light active core having a diameter of 5 mm, comprising a Teflon® FEP tube (Ø=5 mm; Ø=6 mm) filled with an aqueous $NaH_2PO_4$ solution (n=1.38). The internal surface of the FEP tube is coated with a 3 $\mu$thick Teflon® AF 1600 layer (n=1.31). The light guide is sealed at both ends with a cylindrical $SiO_2$ window. The incident measuring beam has a divergence of 25°. The stippled graph in FIG. 2 shows for comparative purposes the transmission of a silica fiber bundle UVC light guide of identical dimensions and under the same measuring conditions. The superiority of the UVC liquid light guide is clearly visible.

The only disadvantage of a liquid light guide with $NaH_2PO_4$ solution is that the partial water vapor pressure of the solution at n=1.38–1.39 corresponds to a relative humidity of approx. 80%. With a typical atmospheric relative humidity of around 60% there is diffusion, albeit slow, of $H_2O$ vapor through the wall of the Teflon® FEP tube into the atmosphere. As a result of the diffusion of water vapor through the permeable plastic wall bubbles develop in the inventive UVC light guide after 9–12 months and thus a rapid decay of transmission. The diffusion process of $H_2O$ vapor through the tube wall of the light guide can be slowed down, if the wall thickness of the Teflon® FEP tube, which is usually between 3/10 mm and 5/10 mm for reasons of flexibility, is more than doubled. The bubble-free life of the light guide is increased proportionally with the increase in the Teflon tube wall thickness. However, this is accompanied by reduced flexibility.

Figure 3:
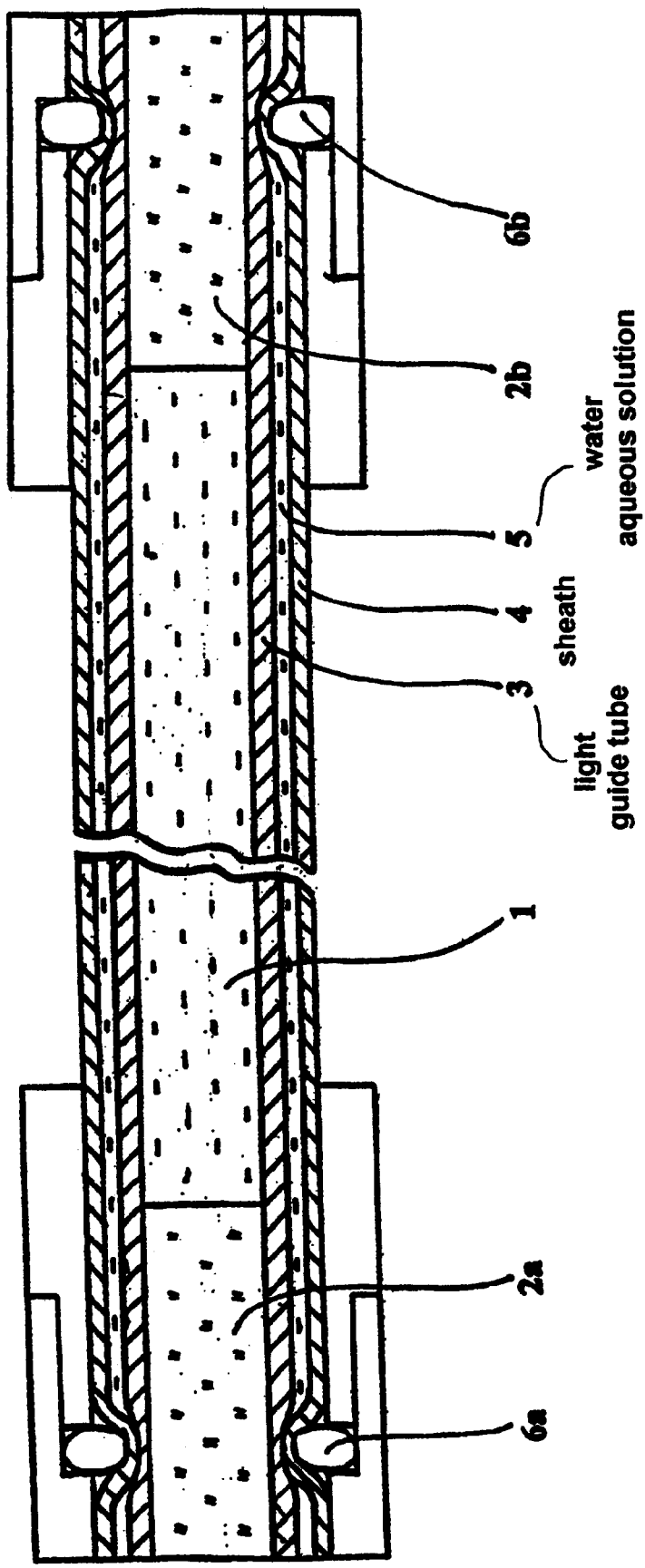
FIG. 3 is a longitudinal view of the interior of the light guide tube of the invention.

An alternative to increasing the life of the UVC light guide with $NaH_2PO_4$ solution is a light guide with two concentrically arranged Teflon tubes where the space between he two Teflon tubes of less than a few 1/10 mm is filled with water or aqueous solution the partial water vapor pressure of which being greater than the one of the light guiding $NaH_2PO_4$ solution in the inner Teflon tube. Such an arrangement is shown in FIG. 3. The $NaH_2PO_4$ solution 1 is inside a FEP tube 3 sealed at both ends by cylindrical silica glass plugs 2a, 2b. The FEP tube 3 has typically the dimensions 5 mm $Ø_i$; 6 mm $Ø_o$.

Concentrical with the FEP tube 3 there is provided a second FEP tube 4 having for example the dimensions 6.4 mm $Ø_i$; 7 mm $Ø_o$. i.e. it has a smaller wall thickness than the inner FEP tube 3, and forming a space 5 having an average width of 2/10 mm. The outer tube 4 as well as the inner tube 3 are press-comected with the end windows 2a and 2b by a single O-ring seal 6a, 6b. Instead of the O-rings 6a, 6b metallic crimped bushings can be used, where both tubes 3 and 4 are press-connected to the respective window 2a or 2b by means of a crimping tool and a single crimping bushing. The space 5 between the two tubes 3 and 4 is filled with water or an aqueous solution the partial water vapor pressure of which is greater than the one of the light guiding $NaH_2PO_4$ solution. The internal surface of the inner FEP tube 3 is coated with a Teflon® AF layer having a thickness of 3 $\mu$or a layer made of another highly transparent, perfluorated material with a refractive index of less than 1.33, such as Hyflon® AD (not shown).

An important fact for increasing the life of the $NaH_2PO_4$ UVC light guide to a period of 5–10 years even in countries with low humidity (California) is that not only the inner tube 3 is made of a fluorocarbon polymer such as Teflon® PEP, Hyflon® MFA or THV (available from 3M), but also the outer tube 4, as tubes made of fluorocarbon polymers have the lowest water vapor permeability among the group of flexible plastic tubes necessary for liquid light guides. The tube 4 can have a wall thickness of only 2/10 to 5/10 mm, because the water layer in the space between die tubes 3 and 4 may develop bubbles without any detrimental effect. The effect of the concentric arrangement of the tubes remains unchanged, even if the space between the tubes 3 and 4 is only partially filled with water. Moreover, a tube 4 having a smaller wall thickness than tube 3 reduces the flexibility of the light guide insignificantly. The Following experiment was carried out to verify the efficiency of the double Teflon tube arrangement:

A UVC light guide comprising:

inner tube 3: Teflon® FEP, $5\emptyset_i \times 6\emptyset_o \times 3000$ filling 1: $NaH_2PO_4$ in $H_2O$, n=1.38 outer tube 4: Teflon® FEP, $6.4\emptyset_i \times 7.0\emptyset_o \times 3000$ liquid between tubes 3 and 4: $H_2O$ was kept at 50° C. during a long-term experiment in a heating oven. A control tube having an identical inner tube 3 and an identical filling 1 but without the outer tube 4 and therefore without water layer 5 was treated in the same way. After 6 months the double tube light guide had developed no bubbles and thus had constant transmission, whereas the control light guide developed rapidly expanding bubbles already after two weeks.

In an experiment as the one described above the water vapor diffusion process is increased significantly and therefore permits an extrapolation of the life of the inventive tight guide to several years under normal environmental conditions.

The manufacture of the inventive double tube light guide with intermediate $H_2O$ layer is as follows:

Step 1: The outer tube 4 being of an arbitrary length is filled with $H_2O$ and sealed at one end.

Step 2: The inner core of the light guide comprising tube 3, light guiding liquid 1 and windows 2a and 2b is manufactured in a manner know per se.

Step 3: The inner core is inserted into the outer tube 4 filled with $H_2O$ until the ends of both tubes are flushing, thereby displacing water from tube 4.

Step 4: At the flushing position a first sealing having the shape of an O-ring squeeze seal or of a crimped bushing is formed such that both concentric tube ends are press-connected with the light guide window.

Step 5: Tube 4 is cut off substantially in alignment with the second light guide window or the end of tube 3.

Step 6: The second sealing is now provided analogous to the first sealing. Using the described procedure the intermediate layer 5 almost completely filled with $H_2O$ is provided without any difficulty as a matter of course.

TABLE 1

Long-term experiment using a light guide and a 25 W UVC light source "Q25 Heraeus"

| a) $CaCl_2$ solution, pH 8 | | b) $NaH_2PO_4$ solution | |
|---|---|---|---|
| Time | $T_{250}$ | Time | $T_{250}$ |
| 0 h | 57% | 0 h | 64% |
| 5 h | 40% | 24 h | 67% |

TABLE 1-continued

Long-term experiment using a light guide and a 25 W UVC light source "Q25 Heraeus"

| a) $CaCl_2$ solution, pH 8 | | b) $NaH_2PO_4$ solution | |
|---|---|---|---|
| Time | $T_{250}$ | Time | $T_{250}$ |
| 21 h | 18% | 144 h | 65% |
| 45 h | 1% | 336 h | 66% |

What is claimed is:

1. A liquid light guide for the UVC range of 220 to 280 nm comprising a Teflon® FEP or Hyflon® MFA light guide tube internally coated with a totally reflecting layer of a fluropolymer having a refractive index of less than 1.333, and an aqueous solution of $NaH_2PO_4$ as a light guiding liquid within said tube; sad light guide further comprising a sheath for the tube, and dispose between the sheath and the light guide tube is water or an aqueous solution having a partial water vapor pressure greater than or equal to that of the light guiding liquid.

2. The liquid light guide of claim 1, wherein the light guiding liquid has a refractive index of less than 1.40.

3. The liquid light guide of claim 2, wherein the aqueous solution has a concentration of 2.5 to 6.5 moil/l of $NaH_2O_4$.

4. The liquid guide of claim 1, wherein the inner diameter of the sheath does not exceed the outer diameter of the light guide tube by more than 1 mm and wherein the sheath is concentrically arranged around the light guide tube.

5. The liquid light guide of claim 4, wherein the inner diameter of the sheath does not exceed the outer diameter of the light guide tube by more than 0.5 mm.

6. The liquid guide of claim 1, wherein the sheath tube comprises a fluoropolymer.

7. The liquid guide of claim 6, wherein the fluoropolymer is selected from the group consisting of Teflon® FEP, Teflon® PTFE, Hyflon® MFA, Teflon® PFA, Teflon® PCTFE, Teflon® ETFE, THV (3M) and a fluoroelastomer.

8. The liquid light guide of claim 4, wherein the sheath tube has a wall thickness smaller than the wall thickness of the light guide tube.

9. The liquid light guide of claim 1 and further comprising at each end thereof, a silica glass cylindrical window connected thereto by a single crimped bushing or a single O-ring squeeze seal.

10. A method for making the UVC liquid light guide of claim 1 comprising:

(a) filling the inner light guide tube with an aqueous $NaH_2PO_4$ solution and sealing it at both end with silica glass plugs;

(b) sealing one end of the outer sheath tube and filing it with water or an aqueous solution;

(c) inserting the inner light guide tube into the outer sheath tube filled with water or a solution and flushing them, to thereby displace water or said solution from the outer sheath tube;

(d) forming a first seating at the alignment or flushing position having the shape of an O-ring squeeze or of a crimped bushing such that both concentric tube ends are press-connected with the first light guide window; and (e) cutting off the outer sheath tube substantially in alignment with the second light guide window and providing a second sealing analogous to the first sealing.

* * * * *